INVENTORS A. H. BOBECK
R. A. KAENEL
BY Herbert M. Shapiro
ATTORNEY

MAGNETIC DOMAIN PROPAGATION DEVICE

Filed Nov. 30, 1965 4 Sheets-Sheet 3

United States Patent Office
3,460,112
Patented Aug. 5, 1969

3,460,112

MAGNETIC DOMAIN PROPAGATION DEVICE

Andrew H. Bobeck and Reginald A. Kaenel, Chatham, N.J., assignors to Bell Telephone Laboratories, Incorporated, New York, N.Y., a corporation of New York Filed Nov. 30, 1965, Ser. No. 510,523
Int. Cl. G11b *5/00*, H04l *9/00*
U.S. Cl. 340—174 11 Claims

ABSTRACT OF THE DISCLOSURE

Information is scrambled in a shift register by changing the positions of stored bits with respect to an input position each time a new bit is stored. A convenient implementation for moving the stored information comprises a second shift register in which a coded pattern of bits is stored between first and second positions. The information in both shift registers is moved back and forth in unison. Each time a coded bit reaches a first or second position in the second register a signal is provided for reversing the direction of propagation and that bit is annihilated.

This invention relates to magnetic circuits and, more particularly, to magnetic information encoders.

Frequently, disturbances along a transmission line cause the loss of information bits being transmitted. Information bits are usually organized in binary words for transmission, and to each of these words error-correction information is commonly added in the form of additional bits having an information bearing relationship to the bits of the associated binary word. If bits are lost during transmission, then, the error-correction information provides an indication thereof for permitting correction in a manner well understood in the art.

There are limitations to the capabilities of error-correction systems, however. For example, an error-correction code may be capable of providing error-correction information for a loss of two or three bits in a word. Consequently, a loss of four or more bits in a word is beyond the capabilities of the particular error-correction code. If, on the other hand, binary bits of a plurality of binary words are scrambled (interleaved) such that the bits of one word are transmitted over a plurality of coded words, disturbances along the transmission line are less likely to cause the loss of such an unmanageable number of bits in a single binary word. Thus, what would appear as an unmanageable loss of four bits in a single coded word would appear only as a loss of, for example, a single bit in each of a sequence of four words when that coded word is decoded at a receiver. The importance of a data scrambler or encoder for the aforedescribed purpose is emphasized by the fact that disturbances along a transmission line frequently cause the loss of a sequence of binary bits.

A data scrambler also has utility for encoding information for secrecy purposes.

An object of this invention is a new and novel magnetic encoder.

The foregoing and further objects of this invention are realized in one embodiment thereof wherein each of a sequence of binary bits comprising a binary word for transmission is "stored" as the presence or absence of a reverse (magnetized) domain in a magnetic wire. As each succeeding information bit is stored at an input position in the wire, previously stored bits are propagated forward and backward (in first and second directions) in a coded manner for changing the positions thereof in the magnetic wire with respect to that input position in accordance with a propagation program stored in an adjacent wire. The sequence of input bits, consequently, is scrambled in a coded manner for transmission.

A feature of this invention is a magnetic device including a magnetic wire and means for propagating reverse domains therein in first and second directions in a coded manner to encode sequential input information for transmission.

The foregoing and further objects and features of this invention may be fully understood from a consideration of the following detailed description rendered in conjunction with the accompanying drawing, wherein.

Figure 1:
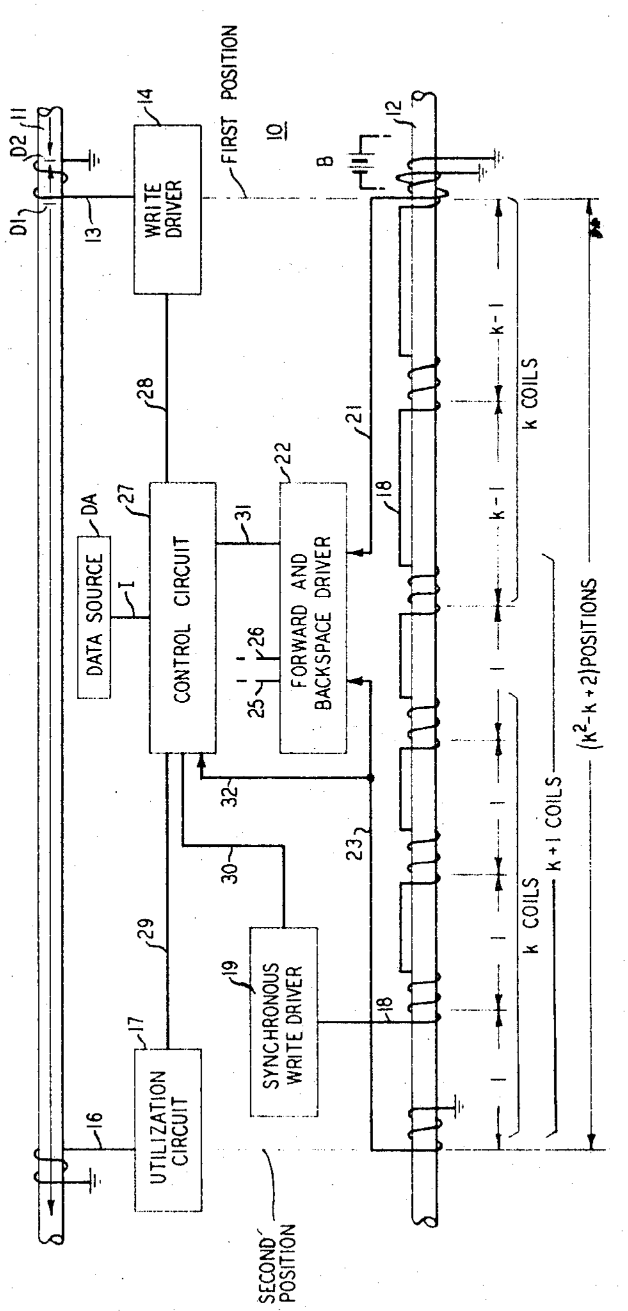
FIG. 1 is a schematic representation of an encoder in accordance with this invention.

Specifically, FIG. 1 depicts an encoder 10, in accordance with this invention, comprising first and second magnetic wires 11 and 12. Magnetic wires 11 and 12 each comprise a magnetic material in which a reverse (magnetized) domain is nucleated in response to a first field in excess of a characteristic nucleation threshold and in which that domain is moved in response to a second field in excess of a characteristic propagation threshold but less than the nucleation threshold. Materials for such wires are well known. Particularly advantageous materials are disclosed in copending application Ser. No. 405,692, now Patent No. 3,350,199, filed Oct. 22, 1964 for D. H. Smith and E. M. Tolman. Devices which employ such materials and are operated in a manner to utilize the described characteristics thereof are commonly termed "domain wall" devices. The representation of a reverse domain in such a wire is discussed hereinafter.

A conductor 13 couples wire 11 at a first (input) position therein and is connected between a write driver 14 and ground. A conductor 16 couples wire 11 at a second (output) position spaced apart from the first and is connected between a utilization circuit 17 (a transmission line) and ground.

A conductor 18 couples wire 12 in a coded fashion between first and second positions therein corresponding to the first and second positions in wire 11. Conductor 18 is connected between a synchronous write driver 19 and ground for nucleating a coded arrangement of reverse domains in wire 12 when pulsed. A conductor 21 couples wire 12 at the first position and is connected between a forward and backspace driver 22 at one end and ground at the other. A conductor 23 couples wire 12 at the second position therein and also is connected between driver 22 and ground. Conductors 21 and 23 are control conductors functioning to reverse driver 22 when a pulse is induced therein as is indicated by the arrowheads in the conductors and as is explained hereinafter. Propagation conductors represented by incomplete line indications, referenced 25 and 26, are each connected between forward and backspace driver 22 and ground and couple both wires 11 and 12. The propagation conductors are well understood in the art and are only indicated here for simplicity. The function thereof in accordance with this invention is explained hereinafter. Write driver 14, utilization circuit 17, synchronous write driver 19, and forward and backspace driver 22 are connected to a control circuit 27, including an input I, via conductors 28, 29, 30, and 31, respectively. A source of binary data DS is connected to the input I of control circuit 27. Conductor 23 also is connected to control circuit 27 via a conductor 32 for signaling the latter when pulsed as described hereinafter. The various drivers, sources, and circuits may be any such elements capable of operating in accordance with this invention.

The operation of the data scrambler or encoder of FIG. 1 is now described in terms of a plurality of short (illustratively three bit) words. Although information is usually transmitted in words of gretaer length, the principles of this invention are most easily described in terms of shorter words. The application of those principles to longer words is clear from that description.

Figure 2:
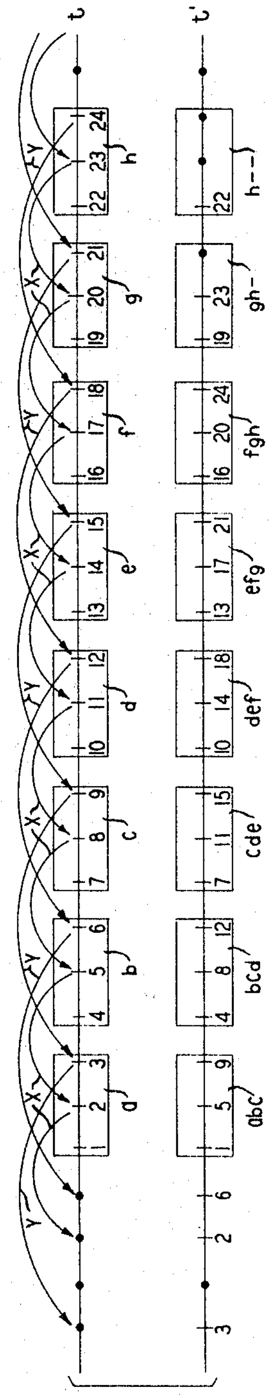
FIG. 2 is a diagram depicting an illustrative sequence of binary bits prior to encoding and after encoding in accordance with this invention.

FIG. 2 is a representation of an illustrative incoming sequence of information bits for transmission. Each bit is represented as a vertical line along a horizontal axis. The horizontal axis is designated *t*, for time, and the vertical lines are designated 1 through 24 from left to right as viewed in the figure. The bits are organized in words of three bits which words are indicated as blocks designated *a* through *h* viewed from left to right in the figure. Curved sets of arrows, designated X and Y, indicate the illustrative scrambling mode. For example, the first bit in each word, that is, the bits corresponding to the vertical lines designated 1, 4, 7, 10 . . . remain, illustratively, in their original position. The second and third bits of each word have changed positions. Each of the arrows designated X originates on one of the vertical lines corresponding to a second bit, 2, 5, 8 . . . , in a word and terminates on a vertical line three positions to the left indicating a change of three positions to the left for each second bit. Similarly, each curved arrow designated Y originates on a third bit, 3, 6, 9 . . . , of a word and terminates six positions to the left indicating a change of six positions to the left for each third bit. For words of arbitrary length $k$, accordingly, succeeding bits are moved $0, k, 2k, 3k, 4k \ldots (k-1)(k)$ positions.

The illustrative scrambled sequence is shown along the horizontal axis designated $t'$. Originally, bits represented by vertical lines designated 1, 2, and 3 constituted word *a*. In the scrambled form, bits represented by vertical lines 1, 5, and 9 occupy corresponding positions. It is clear that those bits come from original words *a*, *b*, and *c*, respectively, as indicated in the figure. A coded word (for example, *abc*) including such bits may be entirely lost in transmission, yet when the transmitted word is decoded a loss of only a single bit per word, *a*, *b*, and *c*, occurs.

When the principles described are applied to words of a more practical length, it will become clear that a loss of an entire coded word (for example, sixty bits) appears as a loss of only one bit for each of many (sixty) succeeding words, a loss well within the assumed error control capabilities. In fact, a loss of several coded words is within the assumed error control capabilities.

The illustrative scrambling of information as indicated in connection with FIG. 2 is provided by the circuit arrangement of FIG. 1. It is assumed, initially, that each binary bit is represented as a reverse domain in wire 11 to facilitate the description. Thereafter, the representation of a binary bit as the presence or absence of a reverse domain is discussed.

Initially, write driver 14 applies a nucleation pulse to conductor 13 (FIG. 1) under the control of control circuit 27 in response to an input thereto from data source DA. A nucleation pulse is applied, concurrently, to conductor 18 via synchronous write driver 19 also under the control of control circuit 27. Usually, the first bit of each binary word for transmission is accompanied by a framing signal employed for synchronization purposes. Those framing signals are used, conveniently, for controlling drivers 14 and 19 via control circuit 27.

Before proceeding with the description of the operation, it is helpful to discuss the response to the pulses in conductors 13 and 18. In response to the nucleation pulse in conductor 13, a stable reverse (magnetized) domain, assumed to represent bit 1, is nucleated in the first position of the magnetic wire 11 coupled thereby. For purposes of this description, wires 11 and 12 are assumed initialized to a "forward" (magnetized) direction represented by arrows directed to the left in the representation of the wires in FIG. 1. A reverse magnetized domain is represented by an arrow directed to the right as viewed and defines trailing and leading domain walls, designated D1 and D2, respectively, with the forward domains. In response to the nucleation pulse in conductor 18, a plurality of (stable) reverse domains is nucleated in wire 12 in accordance with a coded arrangement of couplings between conductor 18 and wire 12.

Figure 3:
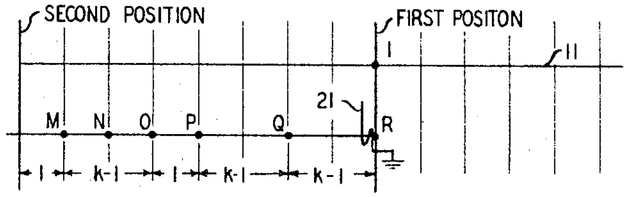
FIGS. 3 through 13 are schematic illustrations of portions of the encoder of FIG. 1 showing the encoded positions of reverse domains representing sequential input binary bits.

The arrangement of reverse domains in wires 11 and 12 is represented in FIG. 3 by dots on horizontal lines which are designated 11 and 12 to indicate the magnetic wires to which the lines correspond. For the illustrative scrambling, that is, for three bit words, conductor 18 is coded to provide six reverse domains in wire 12 between the first and second positions as shown in FIG. 3. The domains are designated M through R and occupy positions in wire 12, starting in the position next adjacent the second position, arranged as M, N, O, P, —, Q, —, R. It is noted that the domain designated R is at the first position as viewed in FIG. 3.

As a general proposition, where the number of bits in a word is $k$ (here=3), then the illustrative arrangement of coded domains is, from left to right in FIG. 3, a reverse domain in each of $k$ positions and, starting in the next available position, a reverse domain in each of $k$ positions space $k-1$ positions apart. The first and second positions are spaced $k^2-k+2$ bit locations apart as indicated in FIG. 1.

In accordance with the illustrative operation, forward and backspace driver 22 also is activated via conductor 31, under the control of control circuit 27, concurrently with the pulsing of conductors 13 and 18 as described, for advancing (in a polyphase manner) all reverse domains in wires 11 and 12 to the right as viewed in FIG. 1. The wiring for domain movement in a polyphase manner is well known in the art and only indicated here as has already been stated. Suffice it to say that conductors 25 and 26 couple both wires 11 and 12 in a manner to provide oppositely poled fields in spaced apart positions when pulsed, and that those conductors are pulsed alternately to propagate reverse domains through those wires in a well known step-by-step manner as described in the aforementioned Smith-Tolman copending application.

Figure 4:
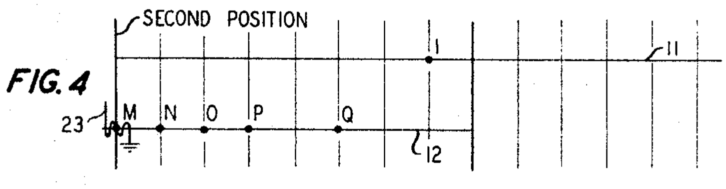

All the reverse domains (that is, the domain representing bit 1 and the coded pattern of domains) in both wires 11 and 12, in response to the propagation pulses, start to advance to the right as viewed in FIG. 3. The domain R is immediately collapsed conveniently by a bias field provided by a battery B coupled to the first position inducing a pulse in conductor 21. The pulse in conductor 21 reverses driver 22. Consequently, all domains are backspaced to the left as viewed in FIG. 3 until the domain designated M in FIG. 4 reaches the second position. Domain M induces a pulse in conductor 23 for reversing forward and backspace driver 22 shown in FIG.

Figure 5:
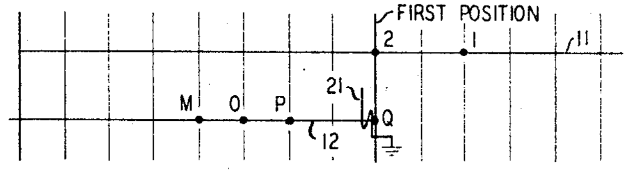

1. Domain M is collapsed thereafter, also conveniently by bias field provided as described for the first position. In response to the reversal of driver 22, all reverse domains in wires 11 and 12 advance to the right (forward) as viewed in FIG. 5. When the domain designated Q in FIG. 5 reaches the first position, it induces a pulse in conductor 21 for reversing forward and backspace driver 22.

Bit 2 is introduced at this juncture in the operation under the control of control circuit 27. Since the propagation rate, typically 500 kilocycles, far exceeds the input rate, typically two kilocycles, control circuit 27 includes means for inhibiting driver 22 until bit 2 arrives. For longer binary input words, the delay in moving stored domains back and forth in the scrambler may be significant. In this case, control circuit 27 may include a buffer store for properly timing input information. It is noted that bit 1 is two positions to the right of the first (input) position when bit 2 arrives. It is also noted that reverse domains are collapsed upon reaching either the first or second position in wire 12.

Figure 6:
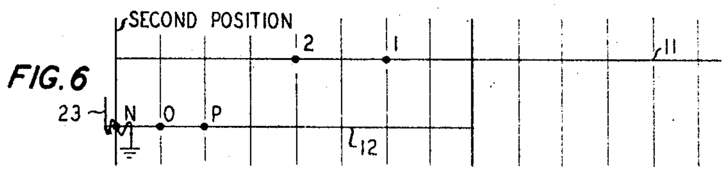
Figure 7:
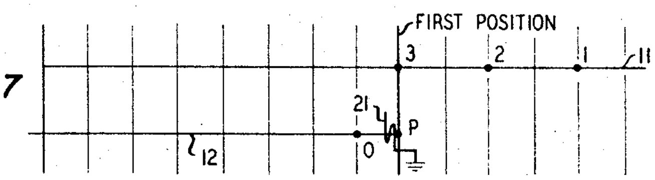

The remaining reverse domains (domains representing bits 1 and 2 and the remaining domains of the coded pattern) in both wires 11 and 12 are backspaced in response to the reversal of driver 22 until the domain designated N in FIG. 6 reaches the second position in wire 12 inducing a pulse in conductor 23 for again reversing driver 22. The remaining domains advance forward (to the right as viewed) until domain P reaches the first position in wire 12 as shown in FIG. 7 to induce a pulse in conductor 21 for reversing driver 22 when so permitted by the control circuit in response to the arrival of the next input bit 3. It is noted that bits 1 and 2 are four and two positions, respectively, to the right of the first (input) position when bit 3 is introduced. Thereafter, the domains are advanced (backward) to the left until domain O reaches the second position as shown in FIG. 8, again inducing a pulse in conductor 23.

At this juncture in the operation, the coded reverse domains in wire 12 are no longer present and the succeeding input bits 1, 2, and 3 shown in FIG. 2 along horizontal line *t* are scrambled into the positions 3, —, 2, —, 1, as shown.

Figure 9:
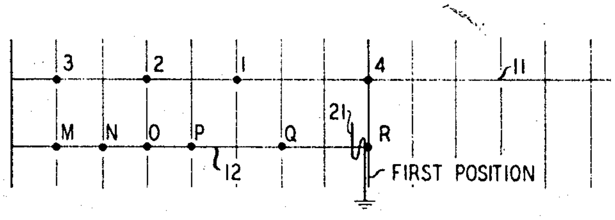

In response to the pulse induced by domain O in conductor 23, forward and backspace driver 22 is reversed. Synchronous write driver 19 pulse conductor 18 under the control of control circuit 27, also in response to that pulse (the *k*th pulse) in conductor 23 (via conductor 32), for again providing the coded arrangement of reverse domains in the wire 12. To this end, control circuit 27 may include means responsive to every *k*th pulse in conductor 23 for activating synchronous write driver 19. The domain R of the coded arrangement induces a pulse in conductor 21 for again immediately reversing driver 22. Driver 22 is now inhibited by control circuit 27 awaiting a next bit 4 of information which corresponds to the first bit of the second illustrative word. Write driver 14 pulses conductor 13 for nucleating a reverse domain at the first position in wire 11 under the control of control circuit 27 initiating the scrambling of the second input word. FIG. 9 shows the resulting arrangement of reverse domains in wires 11 and 12. The arrangement of domains along the representation of wire 11 is seen to correspond to the scrambled bits along horizontal line *t'* in FIG. 2.

Figure 13:
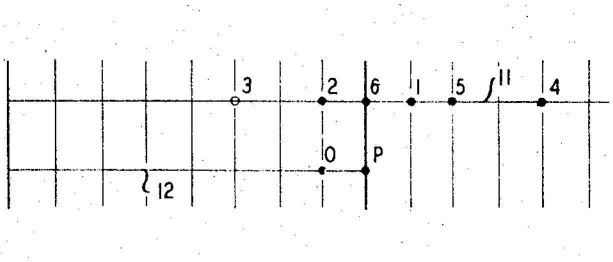

The operation continues as described in connection with FIGS. 3 through 8, permitting the scrambling of succeeding binary words of three bits each time a coded arrangement of six reverse domains is stored in wire 12. FIGS. 9 through 13 show the sequence for scrambling bits 4, 5, and 6. The result is shown in FIG. 13 as 3, —, 2, 6, 1, 5, —, 4, which corresponds to the scrambled sequence shown in FIG. 2.

Figure 8:
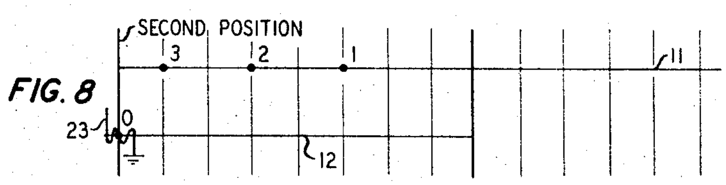

Each time the last domain of the pattern of coded domains (here domain O) reaches the second position in wire 12 as shown in FIG. 8, a new pattern of coded domains is nucleated therein. Thus, synchronous write driver 19 need not be triggered by a first incoming bit (or a framing signal) as described. The last coded domain for the previous transmission has already provided the necessary pattern of coded domains. It is clear, then, that conductor 30 (FIG. 1) may be omitted and conductor 32 connected directly to driver 19 which would then include means responsive to every *k*th pulse in conductor 23 for so activating that driver.

Accordingly, by reversing the propagation driver 14 in a coded manner, previously stored bits (domains) are moved back and forth through wire 11 with respect to an input position, thus determining the position of each newly stored bit with respect to previously stored bits.

Figure 10:
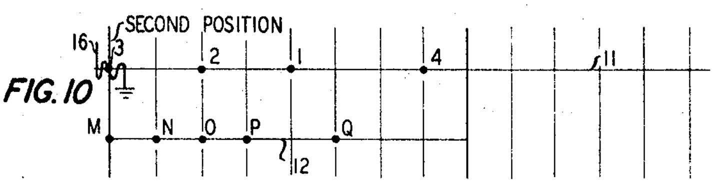
Figure 11:
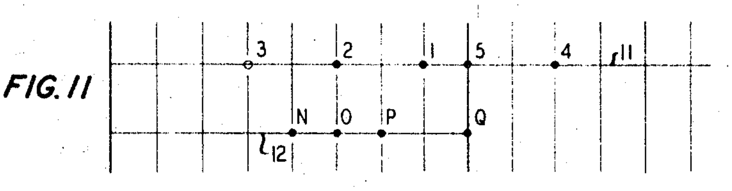
Figure 12:
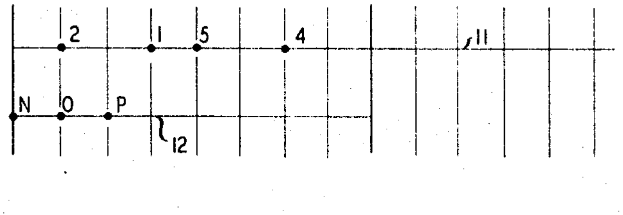

The representation of a domain corresponding to the position of bit 3 is shown as a circle rather than a dot in FIGS. 11 and 13. Such a representation indicates that the domain in the position of bit 3 is already read out when information is disposed as shown in those figures. Actually, a domain in the position of bit 3 is read out as indicated by the arrow at the second (output) position in FIG. 10 when that domain is moved to that position in wire 11 for inducing a pulse in conductor 16. The read-out operation is described further hereinafter.

Figure 14:
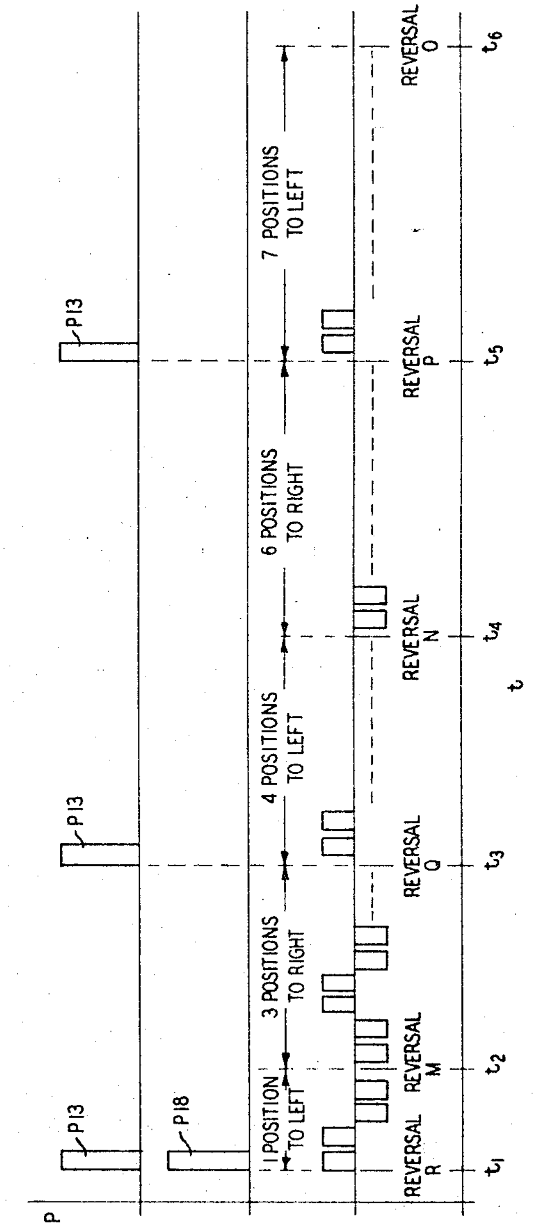
FIG. 14 is a diagram of pulses applied to the encoder of FIG. 1 during operation thereof.

The scrambling operation is summarized in connection with a pulse diagram (for encoding word *a*) shown in FIG. 14. At a time designed *t1* in the figure, conductors 13 and 18 are pulsed to nucleate a reverse domain representing input information (a binary one) in wire 11 and to nucleate the coded arrangement of domains in wire 12. These pulses are represented as pulse forms designated P13 and P18, respectively, in FIG. 14. Also at time *t1*, the propagation sequence is initiated. The propagation driver is reversed at times *t2*, *t3*, *t4*, *t5*, and *t6* in response to pulses induced, when not inhibited by control circuit 27 as described, by reverse domains R, M, Q, N, P, and O, respectively. The propagation sequence thus causes all reverse domains to move one position to the left, three positions to the right, four to the left, six to the right, and seven to the left, as indicated in FIG. 14. At (essentially) each of times *t1*, *t3*, and *t5*, an information bit is stored in wire 11 at the first position there. In more general terms, this sequence may be written $1+0k$, $k+0k$, $1+1k$, $k+1k$, $1+2k$ . . . , where $k$ again is the number of bits in a word. If $x$ designates the (scrambling) move in sequence, of the bits stored, then, for $x=0, 1, 2 \ldots (k-1)$, $1+xk$ back, $k+xk$ forth is a general notation for the code. The sequence repeats for each succeeding binary word until the twenty-four bits shown along horizontal line *t* in FIG. 2 are scrambled as shown along line *t'* in FIG. 2.

A degree of literary license is assumed in the description of the propagation of reverse domains hereinbefore. This is clear from FIG. 14 which shows the usual pattern of propagation pulses applied for moving reverse domains one bit location. It is consistent with prior art teaching that adjacent bits be stored (in bit locations) one position apart and that four propagation pulses be required to move one bit from one location to the next. Thus, "adjacent" positions in wires 11 and 12 are spaced apart one position from one another in practice.

What has been described so far is actually the scrambling of positions rather than the scrambling of bits of information. To this end, it was assumed, for purposes of description, that a reverse domain is stored in each position. Information is stored in domain wall devices, however, as the presence or absence of a reverse (magnetized) domain at each position (actually bit location). Consequently, although the positions of sequential bits are scrambled, some of those positions do not include reverse domains. For example, the first six input binary bits may be 0 1 1 0 1 1. The scrambled positions of those bits are as shown in FIG. 13. The positions designated 1 and 4 in FIG. 13 would, however, include no reverse domains. For a "0" input, the first pulse P13 (time $t1$) in FIG. 14 would be negative, or, alternatively, omitted and no reverse domain would be nucleated at the corresponding position in wire 11.

Outputs are provided when reverse domains in wire 11 are moved to a position coupled by conductor 16 inducing a pulse therein for detection by utilization circuit 17 under the control of control circuit 27. This is indicated in FIG. 10 by the arrow adjacent conductor 16. Reverse domains so detected are collapsed by a suitable bias field as described hereinbefore. As is clear from FIGS. 3 through 13, the illustrative code (for words of any length $k$) provides for early use (filling) of positions adjacent the output position for permitting early read out. This positioning is not necessary and so other codes are permitted.

At the termination of input (incoming) information, information remains in wire 11. This information is read out in the manner described in response to an end-of-transmission signal or, alternatively, in response to read-out instructions appended to each transmission in a manner well understood in the art.

The encoding of wire 12 may be extended, in accordance with the principles discussed, to binary words of arbitrary length as has been indicated hereinbefore. All that is important is that wire 11 extend beyond the first position to store a suitable number of reverse domains when those domains are moved to the right as viewed.

It is to be appreciated that driver 22 may be coded to reverse as described by means other than the specific programming means provided.

Decoding at a remote receiver is provided by a like scrambler coded to scramble the coded information into the original sequence. This may be accomplished most conveniently by employing a code (as described) in a wire 12 of such a decoder and by connecting conductors 21 and 23 of such a decoder such that a pulse in the conductor 23 gates the write driver 14, and a pulse in the conductor 21 gates information into the utilization circuit 17. By this implementation, the decoder operates, essentially, backward (compared to the encoder). For most expeditious decoding in such a backward decoding arrangement, an output conductor 16 of such a decoder may be placed one bit location to the left of the first position in wire 11 as shown in FIG. 1. By way of comparison, information is stored in a scrambled manner and read out sequentially in the encoder. In contradistinction, scrambled information is stored sequentially in the (backward) decoder and read out in a scrambled manner.

What has been described is considered merely illustrative of the principles of this invention and other and varied modifications may be made therein by one skilled in the art without departing from the spirit and scope of the invention.

What is claimed is:

1. In combination, a first propagation medium, first means for providing discontinuities at a first position therein, propagation means for moving discontinuities in first and second directions through said medium, and first control means responsive to each of a sequence of input signals for controlling said propagation means for moving stored discontinuities in first and second directions in a coded manner in said medium each time a discontinuity is provided.

2. A combination in accordance with claim 1 wherein said first propagation medium is a magnetic medium and said first means is a means for storing stable magnetized conditions.

3. A combination in accordance with claim 2 wherein said first magnetic medium comprises a first magnetic domain wall wire, wherein said first means is responsive to input information for storing stable reverse domains, and wherein said propagation means is a means for controllably changing the positions of stored domains with respect to said first position.

4. A combination in accordance with claim 3 said first control means comprising a second magnetic domain wall wire, means for providing in said second wire a coded sequence of reverse domains, and means responsive to the reverse domains of said sequence for controlling said propagation means for moving stored reverse domains in first and second directions in said first and second wires.

5. A combination in accordance with claim 4 wherein said input information is organized into binary words of $k$ bits, and said control means controls said propagation means for moving stored reverse domains through said first and second wires in accordance with the code $1+xk$ in said first direction followed by $k+xk$ in said second direction where $x$ is the number of the move and varies from 0 to $k-1$ starting with $x=0$ for the first move in each of said first and second directions.

6. A combination in accordance with claim 4 wherein said second wire includes a first position and said first and second wires include second positions spaced apart from said first positions, said coded sequence of reverse domains being disposed along said second wire in a coded manner betwen said first and second positions, and second control means being coupled to said second wire at said first and second positions and responsive to the arrival of a reverse domain of said coded sequence at said first or second positions for controlling said propagation means thereby reversing the direction of movement of stored domains in said first and second wires.

7. A combination in accordance with claim 6 including means for collapsing each reverse domain of said coded sequence which arrives at said first or second position.

8. An information encoder comprising first and second magnetic wires, means responsive to input information for selectively nucleating reverse domains at an input position in said first wire, code means for nucleating a pattern of $2k$ reverse domains between first and second positions in said second wire where $k$ is some whole number corresponding to the organization of input information, propagation means for propagating reverse domains in first and second directions through said first and second wires, control means responsive to input information and to the arrival of a reverse domain at said first position in said second wire operative upon said propagation means for propagating reverse domains in said second direction in said first and second wires, means responsive to the arrival of a reverse domain at said second position in said second wire operative upon said propagation means for propagating reverse domains in said first direction in said first and second wires, means responsive to the arrival of a reverse domain at said second position every $kth$ time for activating said code means for nucleating said pattern of $2k$ reverse domains in said second wire, means coupled to an output position in said first wire for reading reverse domains out of said first wire, and means for collapsing reverse domains which arrive at said first or second position in said second wire or at said output position of said first wire, said pattern of $2k$ domains being chosen to insure a net movement of reverse domains from said input to said output position of said first wire.

9. A combination in accordance with claim 8 wherein said input and output positions in said first wire correspond to said first and second positions in said second wire.

10. A combination in accordance with claim 9 wherein a reverse domain in said pattern of $2k$ reverse domains in said second wire is at said first position.

11. In combination, a magnetic wire, means for nucleating a pattern of reverse domains therein between first and second positions, propagation means for propagating reverse domains in first and second directions through said wire, control means responsive to the arrival of a reverse domain at said first or second position operative upon said propagation means for reversing the direction of propagation of reverse domains from said first to said second direction and from said second to said first direction, respectively, and means for collapsing each reverse domain which arrives at said first or second position.

References Cited

UNITED STATES PATENTS

| | | | |
|---|---|---|---|
| 3,114,898 | 12/1963 | Fuller | 340—174 |
| 3,370,280 | 2/1968 | Tickle | 340—174 |

BERNARD KONICK, Primary Examiner

S. POKOTILOW, Assistant Examiner

U.S. Cl. X.R.

178—22